United States Patent [19]
Kim

[11] Patent Number: 6,009,243
[45] Date of Patent: Dec. 28, 1999

[54] METHOD AND APPARATUS FOR PROVIDING PRINTING ENVIRONMENTS IN A PRINTER SHARED BY A PLURALITY OF COMPUTERS

[75] Inventor: Sung-Jae Kim, Seongnam, Rep. of Korea

[73] Assignee: SamSung Electronics Co., Ltd., Kyongki-do, Rep. of Korea

[21] Appl. No.: 08/820,331

[22] Filed: Mar. 12, 1997

[30] Foreign Application Priority Data

Mar. 12, 1996 [KR] Rep. of Korea .......................... 96/6521

[51] Int. Cl.$^6$ .................................................. G06K 15/00
[52] U.S. Cl. ............................................ 395/114; 395/115
[58] Field of Search ..................... 395/114, 116, 395/113, 115; 382/100

[56] References Cited

U.S. PATENT DOCUMENTS

| | | | |
|---|---|---|---|
| 5,528,346 | 6/1996 | Kim et al. | 355/204 |
| 5,530,895 | 6/1996 | Enstrom | 395/829 |
| 5,541,582 | 7/1996 | Wagner et al. | 340/825 |
| 5,566,278 | 10/1996 | Patel et al. | 395/114 |
| 5,625,757 | 4/1997 | Kageyama et al. | 395/3 |
| 5,689,642 | 11/1997 | Hawkins et al. | 395/200 |
| 5,710,582 | 1/1998 | Hawkins et al. | 347/42 |
| 5,799,159 | 8/1998 | Abe | 395/287 |

*Primary Examiner*—Leo H. Boudreau
*Assistant Examiner*—Bhavesh Mehta
*Attorney, Agent, or Firm*—Robert E. Bushnell, Esq.

[57] ABSTRACT

A method and apparatus for providing printing environment of printer shared by a plurality of computers wherein the printing environment according to a user is provided to the printer without data for new printing environment whenever performing printing operation. There is provided a plurality of computers connected to a shared computer via a repeater, a memory for storing printing environment data corresponding to user identifications, a video controller for detecting a user identification accompanying printing data transmitted from one of the plurality of computers for reading out of the memory printing environment data corresponding to the detected user identification and a print engine for printing an image corresponding to the printing data in accordance with the printing environmental data. Additionally, there is provided a method for providing printing environment of a printer shared by a plurality of computers, comprising the steps of: receiving printing data and user identification from one of the plurality of computers; checking whether or not printing environment data corresponding to the received user identification is stored in a memory; reading the printing environment data according to the user identification from the memory when the printing environment data corresponding to the user identification is stored in the memory; and setting a printing environment according to the printing environment data read from the memory.

8 Claims, 2 Drawing Sheets

METHOD AND APPARATUS FOR PROVIDING PRINTING ENVIRONMENTS IN A PRINTER SHARED BY A PLURALITY OF COMPUTERS

CLAIM OF PRIORITY

This application makes reference to, incorporates the same herein, and claims all benefits accruing under 35 U.S.C. §119 from an application entitled *Method For Providing Printing Environment Of Printer Shared By A Plurality Of Computers* earlier filed in the Korean Industrial Property Office on Mar. 12, 1996, and there duly assigned Ser. No. 96-6521 by that Office.

BACKGROUND OF THE INVENTION

1. Field of the Invention

The present invention relates generally to a printer shared by a plurality of computers and, more particularly, to a method and apparatus for providing a printing environments therein.

2. Description of the Related Art

A single repeater connects a single printer to a plurality of computers in order to serve as an interface the computers and the single printer, a sharer sequentially transmits data transmitted from the computers to the printer according to priority, and the printer receives the sequentially transmitted data. The data transmitted from the computers, includes user identification (hereinafter, referred to as user ID) according to a user of the computers, printing data, and printing environment data. Herein, printing environment data includes information such as the size of printing papers, printing density, resolution, and the number of the printing papers. Also, the user ID is used to identify the user in the networking computer environment formed by the plurality of the computers.

An example of a system in which a plurality of computers shares a single printer is provided in U.S. Pat. No. 5,541,582 to Richard H. Wagner, et al. entitled *Apparatus For Data Communication Switching*. In contemporary practice in the art, when the user transmits data to the printer in order to perform a printing operation, the user transmits his user identification (i.e., the user ID), the printing environment data, and the printing data. Thus, each time the user wants to perform the printing operation, the printing environment data must be transmitted to the printer again. The repeater receives the data transmitted from the computers and then provides the data to the printer according to a predetermined priority. The printer checks the user ID, uses the accompanying printing environment data to set the printing environment, and then print an image corresponding to the printing data. I have found however, that contemporary practice in the art suffers from the inconvenience attributable to the need for the user to always provide data for setting the printing environment to the printer prior to initiating a printing operation.

SUMMARY OF THE INVENTION

It is therefore an object of the present invention to provide a method and apparatus for providing printing environment data in printer shared by a plurality of computers.

It is another object to provide a method and apparatus for storing printing environment data in a printer shared by a plurality of users wherein the printing environment data corresponding to an ID of each user of the plurality of computers thereby obviating the need to provide data for a new printing environment from the computer each time a printing operation is performed.

To achieve these and other objects, there is provided a plurality of computers connected to a shared computer via a repeater, a memory for storing printing environment data corresponding to user identifications, a video controller for detecting a user identification accompanying printing data transmitted from one of the plurality of computers for reading out of the memory printing environment data corresponding to the detected user identification and a print engine for printing an image corresponding to the printing data in accordance with the printing environmental data.

Additionally, there is provided a method for providing printing environment of a printer shared by a plurality of computers, comprising the steps of: receiving printing data and user identification from one of the plurality of computers; checking whether or not printing environment data corresponding to the received user identification is stored in a memory; reading the printing environment data according to the user identification from the memory when the printing environment data corresponding to the user identification is stored in the memory; and setting a printing environment according to the printing environment data read from the memory.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
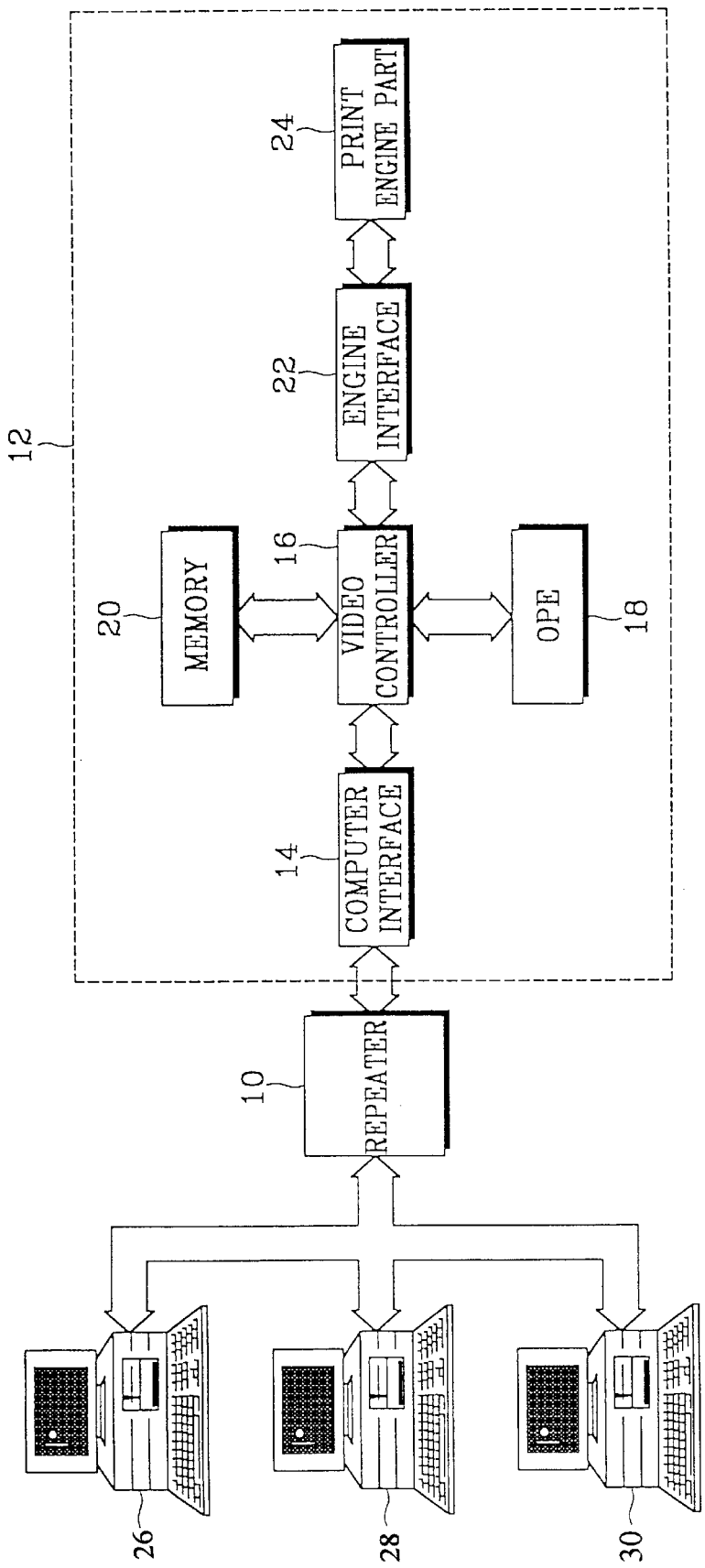
FIG. 1 is a block diagram showing a printer shared by a plurality of computers according to a preferred embodiment of the present invention.

While the present invention is applicable to all printers capable of being shared by a plurality of computers, the present invention is preferably applicable to a laser beam printer as an embodiment thereof. Shown in FIG. 1 is a plurality of personal computers (hereinafter, referred as to PCS) 26, 28 and 30, a repeater 10, and a printer 12. Printer 12 comprises a computer interface 14, a video controller 16, an operating panel equipment 18 (hereinafter, referred to as OPE 18), a memory 20, an engine interface 22, and a print engine part 24. Computer interface 14 is connected between repeater 10 and video controller 16, thereby interfacing input/output signals between printer 12 and PCS 26–30. Video controller 16 converts data code received from computer interface 14 into image data capable of being processed by print engine part 24 and then transmits the converted data code to print engine part 24 via engine interface 22. Memory 20 includes control program and temporarily stores various data inputted from OPE 18 and repeater 10. Memory 20 also stores printing environment data as well as data for a basic (default) printing environment. Engine interface 22 interfaces the input/output print data signals with print engine part 24 under control of the video controller 16. OPE 18 is controlled by video controller 16 and includes a display unit for displaying information according to operations of printer 12 and various keys for inputting various commands according to the present invention. Print engine part 24 prints an image on a print media according to the printing data received from video controller 16.

Typically, PCS 26–30 are comprised of monitors, keyboards, and bodies. When the user transmits the data to the body through the keyboard, the body displays the data on the monitor and/or printer 12. A detailed explanation on PCS 26–30 are omitted hereinafter. Repeater 10 is connected to PCS 26–30 and sequentially interfaces signals between PCS 26–30 and printer 12. When the user turns the power to printer 12 on, video controller 16 initializes printer 12. Upon completing initialization of printer 12, video controller 16 sets the operational state of printer 12 9 to a standby state for receiving data from PCS 26 through 30 inclusive, via repeater 10. The user of one of PCS 26–30 transmits printing data and a user ID to repeater 10 in order to perform a printing operation, and repeater 10 transmits the printing data and user ID to computer interface 14 of printer 12.

Figure 2:
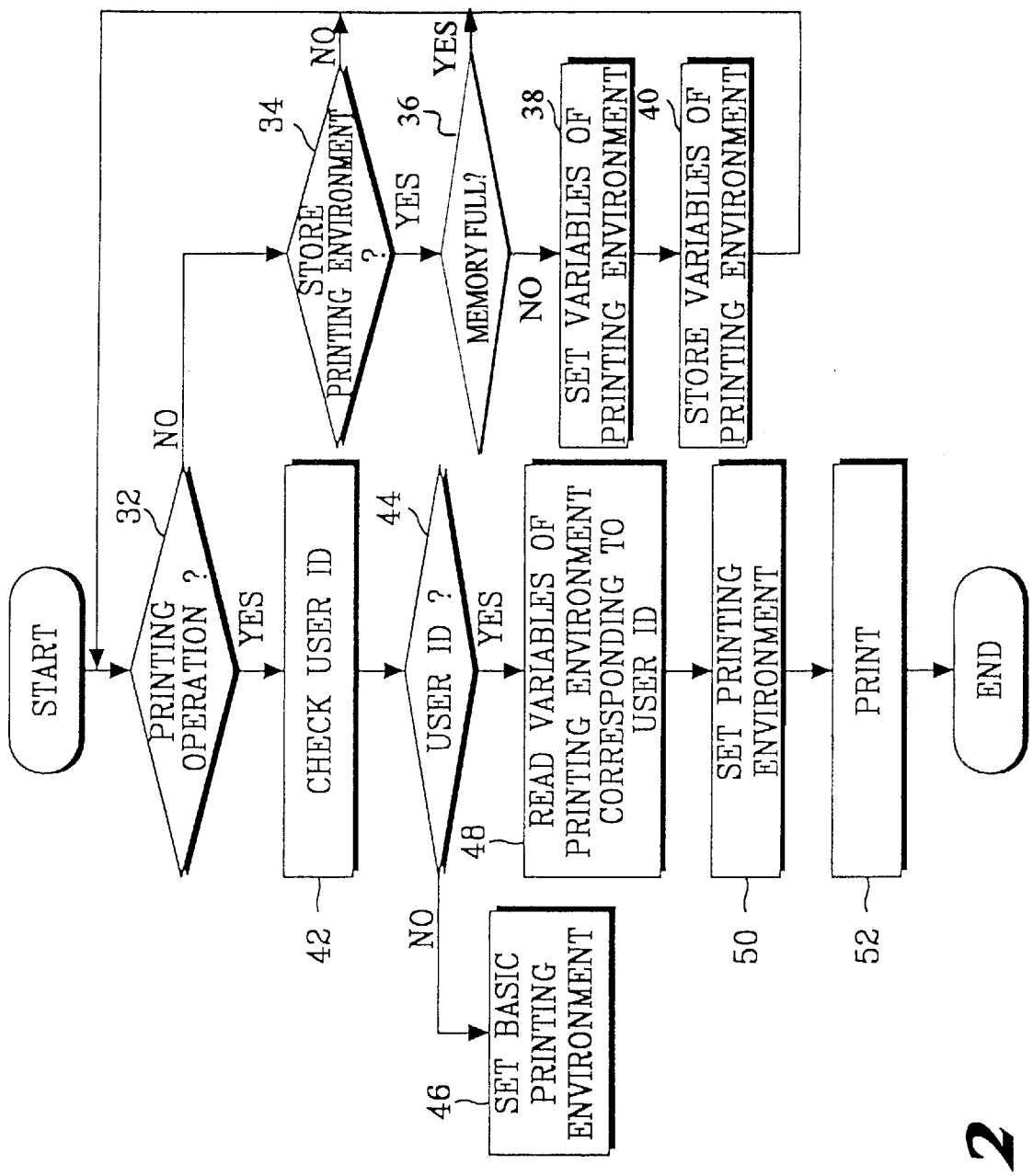
FIG. 2 is a flow chart showing a method for providing printing environment data to a printer shared by a plurality of computers according to a preferred embodiment of the present invention.

Operations of printer 12 will now be discussed with respect to FIG. 2. In step 32 video controller 16 checks whether or not printing data and a user ID are transmitted from repeater 10 to computer interface 14 in order to start a printing operation. When it is determined that printing data and a user ID are transmitted from repeater 10 to computer interface 14, video controller 16 proceeds to step 42. When it is determined that printing data and a user ID are not transmitted from repeater 10 to computer interface 14, video controller 16 proceeds to step 34.

In the step 34, video controller checks for input data from a key input unit of the OPE 18 to determine whether a user, by selection of certain keys, wants to store printing environment data into memory 20. The process returns to step 32 when it is determined that a user does not want to store printing environment data. When it is determined that a user wants to store printing environment data, the process proceeds to step 36. In step 36 video controller checks the capacity of memory 20 to determine whether more data can be entered. When it is determined that memory 20 is full then the process returns to step 32. At this time an error message may displayed on the display of OPE 18 indicating that no new environmental variable can be entered.

When it is determined that memory 20 is not fill, video controller 16 proceeds to step 38, where the user uses the key input unit of OPE 18 to input variables for a desired printing environment. Table 1, below, provides an example of such printing environment variables below. These variable include information such a the user's ID, a printing resolution, type of printing paper, the number of copies, an identification page and a printing density.

| PRINTING ENVIRONMENT TABLE |
| --- |
| User ID |
| Resolution |
| Type of Printing Paper |
| The Number of Copies |
| Identification Page |
| Printing Density |

Video controller 16 then proceeds to step 40 to store the new printing environment variables in memory 20. After the step 40, the process returns to step 32.

As noted above, when it is determined that printing data and a user ID are transmitted from repeater 10 to computer interface 14, video controller 16 proceeds to step 42. In the step 42, video controller 16 checks the user ID, i.e., identifies the user ID, and then determines whether or not there is a corresponding user ID stored in memory 20 in step 44. When it is determined that a corresponding user ID is not stored in memory 20, video controller 16 reads preset variables for a basic (default) printing environment stored in the memory 20 and sets the printing environment as the basic environment according to the variables for the basic environment in step 46.

When it is determined that a corresponding user ID is stored in memory 20, video controller 16 reads the variables of the printing environment corresponding to the user ID stored in memory 20, in step 48, and then sets the printing environment of the printer accordingly in step 50. Then, in step 52 video controller 16 converts the printing data transmitted from repeater 10 into image data and transmits the image data to print engine part 24 so that print engine part 24 prints the image according to the image data.

As apparent from the forgoing, the printer shared by the plurality of computers is set with the printing environment according to the user whenever performing the printing operation. As a result, it has an effect in that it is unnecessary to transmit the image data through setting the printing environment whenever the user wants to perform the printing operation.

What is claimed is:

1. A method for providing printing environment of a single printer shared by a plurality of computers, comprising the steps of:

receiving printing data and a user identification from one of said plurality of computers;

determining whether or not a corresponding user identification is stored in a memory of said printer;

reading out variables for a printing environment according to said user identification from said memory when it is determined that said corresponding user identification is stored in said memory; and setting a printing environment in said printer according to said variables read from said memory;

checking whether or not a user selects to store said variables through an operating panel equipment when printing data and user identification from one of said plurality of computers is not received;

utilizing said operating panel equipment for inputting said variables and said corresponding user identification when it is determined that the user selects to store said variables; and storing said variables and said corresponding user identification in said memory.

2. The method as set forth in claim 1, further comprising the steps of:

determining whether said memory has a capacity for storing said variables and said corresponding user identification when it is determined that the user selects to store said variables;

returning to said step of receiving printing data and a user identification from one of said plurality of computers when it is determined that said memory does not have the capacity for storing said variables and said corresponding user identification; and performing said step of utilizing said operating panel equipment for inputting said variables and said corresponding user identification when it is determined that said memory does have the capacity for storing said variables and said corresponding user identification.

3. The method as set forth in claim 2, further comprising the steps of:
- storing variables of a basic printing environment in said memory;
- reading said variables of said basic printing environment from said memory when it is determined that said corresponding user identification is not stored in said memory; and
- setting said printing environment in said printer according to said variables of said basic printing environment read from said memory.

4. The method as set forth in claim 1, further comprising the steps of:
- storing variables of a basic printing environment in said memory;
- reading said variables of said basic printing environment from said memory when it is determined that said corresponding user identification is not stored in said memory; and
- setting said printing environment in said printer according to said variables of said basic printing environment read from said memory.

5. A method for providing printing environment of a printer shared by a plurality of computers, comprising the steps of:
- receiving printing data and user identification data from at least one of said plurality of computers;
- determining whether data corresponding to said user identification data is stored in a memory of said printer;
- reading out printing environment data according to said user identification from said memory when it is determined that said data corresponding to said user identification data is stored in said memory; and
- setting a printing environment in said printer according to said printing environment data read from said memory; and
- detecting an input from a key panel of an operating panel equipment, said input from said key panel being indicative of a user intending to store data corresponding to identification data of said user and corresponding printing environment data when said printing data and user identification data from at least one of said plurality of computers is not received;
- utilizing said operating panel equipment for inputting said data corresponding to identification data of said user and said corresponding printing environment data upon detection of said input in said detecting step; and
- storing said data corresponding to said identification data of said user and said corresponding printing environment data in said memory.

6. The method as set forth in claim 5, further comprising the steps of:
- storing basic printing environment data in said memory;
- reading said basic printing environment data from said memory when it is determined that said data corresponding to said user identification data is not stored in said memory; and
- setting said printing environment in said printer according to said basic printing environment data read from said memory.

7. The method as set forth in claim 5, further comprising the steps of:
- determining whether said memory has a capacity for storing said data corresponding to said identification data of said user and said corresponding printing environment data upon detection of said input in said detecting step;
- returning to said step of receiving printing data and user identification data from at least one of said plurality of computers when it is determined that said memory does not have the capacity for storing said data corresponding to said identification data of said user and said corresponding printing environment data; and
- performing said step of utilizing said operating panel equipment for inputting said data corresponding to identification data of said user and said corresponding printing environment data when it is determined that said memory does have the capacity for storing said data corresponding to said identification data of said user and said corresponding printing environment data.

8. The method as set forth in claim 5, wherein said step of setting said printing environment data comprises:
- setting a type of printing paper to be used;
- setting a number of copies to be printed;
- setting a printing resolution;
- setting a printing density; and
- setting a page identifier.

* * * * *